2,820,066

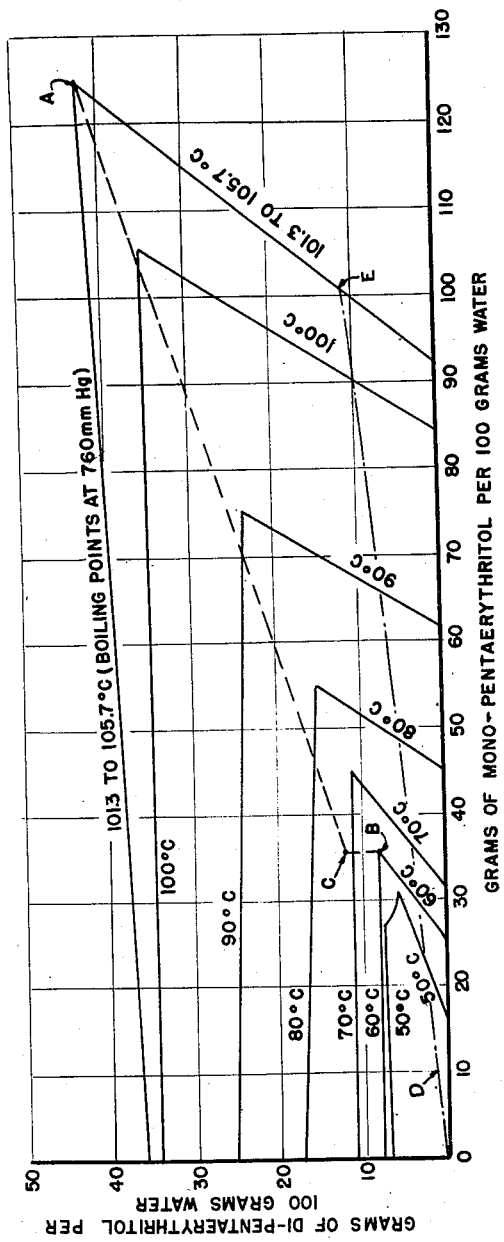
Jan. 14, 1958 W. E. TAYLOR 2,820,066
SEPARATION OF MIXTURES OF PENTAERYTHRITOL
AND DIPENTAERYTHRITOL
Filed May 27, 1954
INVENTOR.
WALLACE E. TAYLOR
BY
ATTORNEYS

SEPARATION OF MIXTURES OF PENTAERYTHRITOL AND DIPENTAERYTHRITOL

Wallace E. Taylor, Corpus Christi, Tex., assignor to Celanese Corporation of America, New York, N. Y., a corporation of Delaware Application May 27, 1954, Serial No. 432,791

20 Claims. (Cl. 260—615)

This invention relates to the separation of pentaerythritol and dipentaerythritol from mixtures thereof.

As is well known, pentaerythritol, hereinafter called "monopentaerythritol," is commonly produced by the reaction of formaldehyde and acetaldehyde in the presence of an alkaline material such as lime. The product of this reaction generally contains a minor proportion, e. g. about 5 to 15%, of dipentaerythritol in admixture with the desired monopentaerythritol. Since the presence of such amounts of dipentaerythritol is undesirable for many purposes, various methods have been suggested for removing most of this ingredient from the mixture. These methods are generally complicated and expensive.

It is therefore an object of this invention to provide a novel, simple and inexpensive method for the separation of monopentaerythritol from mixtures thereof containing minor amounts of dipentaerythritol.

Another object of this invention is the provision of a novel method for the separation of dipentaerythritol from mixtures thereof with monopentaerythritol.

Other objects of this invention will be apparent from the following detailed description and claims.

In accordance with the process of this invention an aqueous solution, containing dipentaerythritol and at least 3 parts, by weight, of monopentaerythritol per part of dipentaerythritol, is heated to evaporate water therefrom and thus to cause monopentaerythritol to precipitate from the solution. The evaporation is carried out until the ratio, by weight, of monopentaerythritol to dipentaerythritol in the solution is reduced to not more than about 2.9:1 but not so far as to cause substantial precipitation of dipentaerythritol. The precipitated monopentaerythritol is separated from the solution. Thereafter the solution is diluted with water and cooled, to a temperature which is not below about 60° C., to cause the precipitation of dipentaerythritol therefrom, without substantially precipitating monopentaerythritol, following which the precipitated dipentaerythritol is separated from the solution. As a result of the precipitation of the dipentaerythritol the ratio, by weight, of monopentaerythritol to dipentaerythritol in the remaining solution is raised to at least 3:1.

The process of this invention may be understood more readily by a consideration of the accompanying drawing which is a phase diagram for the system monopentaerythritol-dipentaerythritol-water at temperatures ranging from 50° C. to the boiling points at atmospheric pressure of the aqueous solutions containing monopentaerythritol and dipentaerythritol. This phase diagram is based on work done in connection with this invention with substantially pure materials. When the less pure materials encountered in commercial practice are employed the diagram is substantially the same, though there are minor variations in temperature and proportions.

As will be seen from the drawing, the phase diagram comprises a set of curves indicating the solubility of mixtures of monopentaerythritol and dipentaerythritol at various temperatures. The area enclosed within each curve, that is, the area below and to the left of each curve, represents the proportions in which there is only one phase present, that phase being a solution of monopentaerythritol or dipentaerythritol, or both, in water.

It will be apparent from these curves that, at the temperatures shown in the drawing, monopentaerythritol is more soluble in water when the water contains dipentaerythritol. For example, considering the 70° C. curve, it will be seen that monopentaerythritol, alone, is soluble in water to the extent of about 31 grams per 100 grams of water, while the addition of 10 grams of dipentaerythritol to the 100 grams of water increases the solubility at 70° C. to about 43 grams of monopentaerythritol per 100 grams of water. On the other hand, the presence of monopentaerythritol in the water has a relatively small effect on the solubility of dipentaerythritol therein, the upper portions of the curves shown in the drawing being relatively flat.

It is a characteristic of the type of diagram shown in the drawing that a change in the proportion of the water in the mixture, while the monopentaerythritol:dipentaerythritol ratio remains constant, may be represented by a straight line passing through the origin (i. e. the zero point of the diagram) so long as the solubility of the monopentaerythritol or dipentaerythritol is not exceeded. Thus, if a dilute solution having a monopentaerythritol:dipentaerythritol ratio of 90:10 by weight, for example, a mixture having the composition represented by the point D on the diagram, is boiled at atmospheric pressure to evaporate a portion of the water therefrom, the changes in the composition of the mixture are indicated by the line D—E. Further boiling to evaporate more water at atmospheric pressure results in precipitation of crystals of monopentaerythritol and causes the composition of the remaining solution to change along the line EA, that is, along the curve representing the solubility of the mixture at its boiling point at atmospheric pressure. Further boiling, at atmospheric pressure, beyond the point A, results in the precipitation of a mixture of dipentaerythritol and monopentaerythritol.

In the phase diagram shown in the drawing, the point A corresponds to a ratio, by weight, of monopentaerythritol to dipentaerythritol of about 2.9:1 and the boiling point of the mixture at this point A is about 105.7° C. Actually, it has been found that when a commercial aqueous mixture of monopentaerythritol and dipentaerythritol is boiled at atmospheric pressure, the mixture can be evaporated until its boiling point is about 107.9° C. before any large amount of dipentaerythritol is precipitated, and the ratio of monopentaerythritol to dipentaerythritol at this boiling point is less than 2.9:1, i. e. about 2.1:1. However, these differences do not affect the general principle of operation of the invention.

In accordance with a preferred form of this invention, an aqueous solution containing less than 1 part by weight of dipentaerythritol to about 3 parts of monopentaerythritol, preferably a mixture in which the ratio of monopentaerythritol to dipentaerythritol is at least about 4:1, is boiled at atmospheric pressure to cause precipitation of monopentaerythritol without causing substantial precipitation of dipentaerythritol. For example, the solution may be heated until its composition is that indicated by point A on the phase diagram. After separation of the precipitated monopentaerythritol, the solution is diluted with water, whereupon its composition changes along the straight line AC, whose extension passes through the origin of the diagram. For best results, sufficient water is added to bring the composition to the point C, where the ratio of water to monopentaerythritol is about 100:37. The solution is then cooled, preferably to about 60° C., to cause the precipitation of dipentaerythritol. Accordingly, the composition of the remaining solution is that represented by point B. That is, the ratio of water to monopentaerythritol is still 100:37, but the ratio of monopentaerythritol to dipentaerythritol has increased from about 2.9:1 to about 4.6:1, due to the precipitation of dipentaerythritol from the solution. The same sequence of steps can then be repeated. Thus, the solution having the composition represented by point B may be treated by boiling it at atmospheric pressure to precipitate monopentaerythritol and to produce a solution having the composition represented by point A on the diagram; then, after separation of the precipitated monopentaerythritol, diluting the remaining solution with water to produce a composition represented by point C, and cooling to 60° C. This cycle may be repeated until resolution of the mixture into its components is substantially complete.

In commercial operation, however, it is not practical to carry out the repetition of the cycle described above with a single mixture. Instead, the mixture having the composition represented by point B is recycled by adding it to the fresh feed, wherein the ratio of monopentaerythritol to dipentaerythritol is greater than about 3:1, e. g. about 85:15 to 95:5, and the resulting mixture is boiled, diluted and cooled in the manner described above.

For maximum recovery of pentaerythritol in the boiling operation, the evaporation of water should be carried out until the solution is almost saturated with respect to dipentaerythritol. The crystals of monopentaerythritol formed during boiling may be separated intermittently or continuously from the solution being boiled. Advantageously, this separation should be carried out while allowing as little cooling of the solution as possible, since cooling tends to cause precipitation of dipentaerythritol as well as monopentaerythritol at this point and therefore causes the monopentaerythritol product to be contaminated. Very good results in this respect have been obtained by effecting the separation by means of a steam heated centrifuge equipped with a screen for retaining the crystals of monopentaerythritol. It is also desirable to wash the crystals of monopentaerythritol with hot water to displace any occluded mother liquor therefrom. The washings may be added to the mother liquor. The crystals of monopentaerythritol thus obtained are relatively large and quite uniform in size.

As stated, after the evaporation of water and separation of the monopentaerythritol the solution is diluted and cooled. For optimum results the amount of water used for dilution is so regulated, in relation to the temperature to which the solution is cooled, that there is produced a diluted and cooled solution which is substantially saturated, not only with respect to dipentaerythritol, but also with respect to monopentaerythritol. Thus, in the drawing the solution at point B is substantially saturated with respect to both monopentaerythritol and dipentaerythritol, while the ratio of monopentaerythritol to water at point C, before the solution is cooled to 60° C., is equal to said ratio at point B.

It will also be seen from the drawing that, other factors being equal, the lower the temperature to which the diluted solution is cooled, the greater will be the amount of dipentaerythritol separated therefrom during said cooling. However, the temperature should not be reduced below about 60° C., e. g. to about 50° C., since at lower temperatures aqueous mixtures of monopentaerythritol and dipentaerythritol are not resolvable to substantially pure monopentaerythritol and/or dipentaerythritol by crystallization, as will be seen from the shape of the 50° C. curve in the drawing. This effect at about 50° C. is probably due to formation of a complex, or "double compound," of monopentaerythritol and dipentaerythritol. It is preferable, therefore, to cool the diluted solution to a temperature of about 60 to about 70° C., with best results being obtained at about 60° C. Of course, if the solution is to be cooled to 70° C. rather than to about 60° C., it is preferable to reduce the amount of water used for dilution, so that, as explained previously, the resulting diluted and cooled solution will be substantially saturated with respect to monopentaerythritol. Advantageously, the ratio of monopentaerythritol to dipentaerythritol, in the solution remaining after the precipitation of the dipentaerythritol, is at least about 4:1.

The dipentaerythritol precipitates rather slowly from the diluted and cooled solution. It is therefore advantageous to allow a relatively long period of time, e. g. about 2 hours, for the precipitation of the dipentaerythritol in order to insure that as much dipentaerythritol as possible is obtained. The precipitate of dipentaerythritol is in the form of very fine crystals, which may be separated in any desired manner, as by filtration aided by centrifugal force, followed by washing of the crystals with water to displace any occluded mother liquor. The washings may be added to the mother liquor. It is found that any impurities present in the solution tend to be concentrated in the precipitated dipentaerythritol. This is advantageous in maintaining the purity of the monopentaerythritol produced by the process of this invention. However, when such impurities in the dipentaerythritol are undesirable they may be eliminated by appropriate treatment at any stage of the process. Thus the mixture being fed to the evaporation step may be purified by treatment with activated carbon in a manner well known to the art.

While the process of this invention is operated most conveniently at atmospheric pressure, subatmospheric or superatmospheric pressures may be employed at any stage, including the boiling step, if desired.

The process of this invention lends itself readily to continuous operation. Thus, in one convenient continuous process, the fresh feed and the solution being recycled are supplied continuously to an evaporation zone wherein the solution being boiled is maintained saturated with respect to dipentaerythritol. Crystals of monopentaerythritol, water vapor and a portion of the solution being boiled are withdrawn continuously from the evaporation zone at a rate equal to the rate of supply of the fresh feed and recycled solution. Thereafter, the solution withdrawn from the evaporation zone is diluted and cooled, in accordance with this invention, in a continuous manner, if desired. A suitable form of evaporation zone for use in this process is a "salt box evaporator," of known type, which is an evaporator vessel having a conical bottom, the base of which is equipped with a settling leg or "salt box." As crystals are formed during the evaporation, they fall by gravity into this leg and are pumped out with accompanying liquor as a slurry to a separation device.

The process of this invention may also be employed when the mixture to be resolved has a relatively high content of dipentaerythritol. Thus when the ratio of dipentaerythritol to monopentaerythritol in the mixture to be resolved is more than about 1:4, the mixture may be dissolved in hot water, e. g. water having a temperature of 70 or 80° to 100° C. and then cooled to precipitate out a portion of the dipentaerythritol therefrom. For example, the mixture to be resolved may be dissolved in a sufficient amount of hot water to provide in the neighborhood of 2.7 parts of water per part of monopenaterythritol and then cooled to 60° C. to precipitate out dipentaerythritol to produce a solution substantially saturated with respect to both monopentaerythritol and dipentaerythritol and having the composition represented by point B on the drawing. The resulting solution may then be subjected to the evaporation step, as previously described, to precipitate crystals of monopentaerythritol therefrom.

The following examples are given to illustrate this invention further.

*Example I*

A mixture containing 86% monopentaerythritol and 14% dipentaerythritol, produced by a process involving the reaction of formaldehyde and acetaldehyde in the presence of lime, is mixed with an equal weight of boiling water and the resulting solution is boiled at atmospheric pressure to evaporate water until the boiling point of the solution rises to 105.7° C. During the evaporation crystals of monopentaerythritol are precipitated. These crystals are isolated periodically from the solution by centrifuging said crystals in a centrifuge heated with dry steam. The crystals, which are retained in the centrifuge bowl, are washed therein with 10% of their weight of water having a temperature of 90° to 100° C. The crystals are then oven-dried at 90° C. to constant weight. After the evaporation step the solution is diluted with 89% of its weight of water, including the water obtained by washing the monopentaerythritol crystals, and slowly cooled with stirring to 60° C. The temperature of the solution is maintained at 60° C. for two hours while crystals of dipentaerythritol precipitate out. The dipentaerythritol crystals are separated from the mother liquor by centrifugation at 60° C. followed by washing in the centrifuge with 10% of their weight of water. Due to the fineness of the dipentaerythritol crystals, it is necessary to use a liner of fine filter cloth in the bowl of the centrifuge in order to retain said crystals. The mother liquor and the washings are then subjected to a repetition of the boiling, diluting and cooling steps described above. The monopentaerythritol obtained is of high purity, containing less than 4% of dipentaerythritol and having a melting point of about 260° C.

Example II

A mixture of solids comprising 500 parts by weight of monopentaerythritol and 500 parts by weight of dipentaerythritol is added to 1350 parts by weight of hot water having a temperature of 80 to 100° C. and the mixture is agitated so that all the monopentaerythritol dissolves. The mixture is then chilled to 60° C. and kept at that temperature for about 2 hours to precipitate crystals of dipentaerythritol, which crystals are separated from the aqueous solution and washed with water. 392 parts by weight of crystals are obtained. The mother liquor and washings are then subjected to the evaporation and dilution procedures described above.

It is to be understood that the foregoing detailed description is merely by way of illustration and that many variations may be made therein without departing from the spirit of my invention.

Having described my invention, what I desire to secure by Letters Patent is:

1. Process for the separation of monopentaerythritol and dipentaerythritol from a mixture thereof, which comprises heating an aqueous solution containing dipentaerythritol and at least 3 parts by weight of monopentaerythritol per part of dipentaerythritol to evaporate water from said solution and to precipitate monopentaerythritol therefrom, the evaporation of water being carried out until the ratio, by weight, of monopentaerythritol to dipentaerythritol in the solution is reduced to not more than about 2.9:1 but not so far as to cause the substantial precipitation of dipentaerythritol therefrom, separating the precipitated monopentaerythritol from the solution, diluting the solution with water and cooling the solution sufficiently to cause the precipitation of dipentaerythritol therefrom, without substantially precipitating monopentaerythritol, and to produce a solution in which the ratio, by weight, of monopentaerythritol to dipentaerythritol is at least 3:1, the temperature to which the solution is cooled being at least about 60° C., and separating the precipitated dipentaerythritol from the remaining solution.

2. Process as set forth in claim 1 in which the solution supplied to said evaporation step contains at least 4 parts of monopentaerythritol per part of dipentaerythritol.

3. Process as set forth in claim 1 in which the evaporation is carried out by boiling.

4. Process as set forth in claim 3 in which, after the separation of the precipitated dipentaerythritol, the ingredients of the remaining solution are boiled to evaporate water and to precipitate monopentaerythritol therefrom, the boiling being carried out until the ratio, by weight, of dissolved monopentaerythritol to dissolved dipentaerythritol is reduced to not more than about 2.9:1 but not so far as to cause substantial precipitation of dipentaerythritol.

5. Process as set forth in claim 1 in which the amount of water added during said dilution is so regulated, with respect to the temperature to which the diluted solution is cooled, that the resulting cooled and diluted solution is substantially saturated with respect to both monopentaerythritol and dipentaerythritol.

6. Process as set forth in claim 5 in which the diluted solution is cooled to about 60° to about 70° C.

7. Process as set forth in claim 5 in which the amount of water added during said dilution is sufficient to reduce the concentration of monopentaerythritol to about 37 grams of monopentaerythritol per 100 grams of water and in which the diluted solution is cooled to about 60° C.

8. Process for the separation of monopentaerythritol and dipentaerythritol from a mixture thereof, which comprises boiling an aqueous solution containing dipentaerythritol and at least 3 parts, by weight, of monopentaerythritol per part of dipentaerythritol to evaporate water therefrom and to precipitate monopentaerythritol therefrom, the evaporation of water being carried out until the ratio, by weight, of monopentaerythritol to dipentaerythritol in the solution is reduced to not more than about 2.9:1 but not so far as to cause the substantial precipitation of dipentaerythritol therefrom, separating the precipitated monopentaerythritol from the solution, diluting the solution with water and cooling the solution sufficiently to cause the precipitation of dipentaerythritol therefrom, without substantially precipitating monopentaerythritol, and to produce a solution in which the ratio, by weight, of monopentaerythritol to dipentaerythritol is at least 3:1, the temperature to which the solution is cooled being at least about 60° C., separating the precipitated dipentaerythritol from the remaining solution, and subjecting said remaining solution, together with a fresh feed mixture comprising an aqueous solution of monopentaerythritol and dipentaerythritol, to said boiling and separating steps to produce further quantities of monopentaerythritol, the ratio of monopentaerythritol to dipentaerythritol in the total feed supplied to said boiling step being at least 3:1.

9. Process as set forth in claim 8 in which the ratio of monopentaerythritol to dipentaerythritol in the total feed supplied to said boiling step is at least about 4:1.

10. Process as set forth in claim 9 in which the weight ratio of monopentaerythritol to dipentaerythritol in said fresh feed mixture is about 85:15 to 95:15.

11. Process as set forth in claim 10 in which the amount of water added during said dilution is so regulated, with respect to the temperature to which the diluted solution is cooled, that the resulting cooled and diluted solution is substantially saturated with respect to both monopentaerythritol and dipentaerythritol.

12. Process as set forth in claim 10 in which said fresh feed mixture is supplied continuously to said boiling step and said remaining solution is recycled to said boiling step.

13. Process as set forth in claim 12 in which the diluted solution is cooled to about 60° to about 70°.

14. Process as set forth in claim 12 in which the amount of water added during said dilution is sufficient to reduce the concentration of monopentaerythritol to about 37 grams of monopentaerythritol per 100 grams of water and in which the diluted solution is cooled to about 60° C.

15. Process for the separation of dipentaerythritol from an aqueous solution containing dipentaerythritol and monopentaerythritol, there being in said solution not more than about 2.9 parts of monopentaerythritol per part of dipentaerythritol, said solution being substantially saturated with respect to monopentaerythritol, which comprises diluting the solution with water and cooling the solution sufficiently to cause the precipitation of dipentaerythritol therefrom, without substantially precipitating monopentaerythritol, and to produce a solution in which the ratio, by weight, of monopentaerythritol to dipentaerythritol is at least 3:1, the temperature to which the solution is cooled being at least about 60° C., and separating the precipitated dipentaerythritol from the remaining solution.

16. Process as set forth in claim 15 in which the initial aqueous solution contains about 2.1 to 2.9 parts of monopentaerythritol per part of dipentaerythritol.

17. Process as set forth in claim 15 in which the amount of water added during said dilution is so regulated, with respect to the temperature to which the diluted solution is cooled, that the resulting cooled and diluted solution is substantially saturated with respect to both monopentaerythritol and dipentaerythritol.

18. Process as set forth in claim 17 in which the diluted solution is cooled to about 60° C.

19. Process which comprises preparing an aqueous solution containing dipentaerythritol and monopentaerythritol, there being in said solution at least about 1 part of dipentaerythritol per 4 parts of monopentaerythritol and not more than about 100 parts of water per 37 parts of monopentaerythritol, at an elevated temperature above 60° C., cooling said solution sufficiently to cause the precipitation of dipentaerythritol therefrom, without substantially precipitating monopentaerythritol, the temperature to which the solution is cooled being at least about 60° C., and separating the precipitated dipentaerythritol from the remaining solution.

20. Process as set forth in claim 19 in which the amount of water present in the initial solution is so regulated with respect to the temperature to which the diluted solution is cooled that the resulting cooled solution is substantially saturated with respect to both monopentaerythritol and dipentaerythritol.

References Cited in the file of this patent

UNITED STATES PATENTS 2,288,929    Wyler ------------------ July 7, 1942